United States Patent
Newbolt et al.

(10) Patent No.: US 7,740,423 B2
(45) Date of Patent: Jun. 22, 2010

(54) VACUUM MODULATING AIR CONTROL VALVE APPARATUS

(75) Inventors: Richard E. Newbolt, Sabetha, KS (US); Jonathan Thorn, Sabetha, KS (US)

(73) Assignee: MAC Equipment, Inc., Kansas City, MO (US)

( * ) Notice: Subject to any disclaimer, the term of this patent is extended or adjusted under 35 U.S.C. 154(b) by 423 days.

(21) Appl. No.: 11/881,448

(22) Filed: Jul. 27, 2007

(65) Prior Publication Data

US 2008/0025801 A1    Jan. 31, 2008

Related U.S. Application Data

(60) Provisional application No. 60/833,686, filed on Jul. 27, 2006.

(51) Int. Cl.
 *B65G 51/16* (2006.01)
(52) U.S. Cl. ............... 406/14; 406/30; 406/144; 406/151
(58) Field of Classification Search ............ None
 See application file for complete search history.

(56) References Cited

U.S. PATENT DOCUMENTS

| | | | | |
|---|---|---|---|---|
| 2,701,166 | A * | 2/1955 | Pursel | 406/93 |
| 3,403,941 | A * | 10/1968 | Solt | 406/30 |
| 3,410,530 | A * | 11/1968 | Gilman | 366/76.2 |
| 3,437,384 | A * | 4/1969 | Bozich | 406/124 |
| 4,171,853 | A * | 10/1979 | Cleaver et al. | 406/48 |
| 4,172,535 | A * | 10/1979 | Smith | 222/58 |
| 4,373,838 | A * | 2/1983 | Foreman et al. | 406/14 |
| 4,501,518 | A * | 2/1985 | Smith | 406/25 |
| 4,583,885 | A * | 4/1986 | Thiele | 406/168 |
| 4,862,649 | A * | 9/1989 | Davis et al. | 451/38 |
| 4,975,100 | A * | 12/1990 | Ginelli | 96/397 |
| 5,044,836 | A * | 9/1991 | Grooms | 406/22 |
| 5,064,314 | A * | 11/1991 | Grooms et al. | 406/22 |
| 5,114,280 | A * | 5/1992 | Ushitora et al. | 406/18 |
| 5,224,243 | A * | 7/1993 | Schlepfer et al. | 19/205 |
| 5,252,008 | A * | 10/1993 | May et al. | 406/23 |
| 5,562,367 | A * | 10/1996 | Scott | 406/13 |
| 5,871,027 | A * | 2/1999 | Shimizu et al. | 137/205 |
| 6,089,794 | A * | 7/2000 | Maguire | 406/18 |
| 6,383,301 | B1 * | 5/2002 | Bell et al. | 118/716 |
| 6,588,988 | B2 * | 7/2003 | Zlotos | 406/14 |
| 6,923,601 | B2 * | 8/2005 | Goth | 406/152 |
| 7,066,689 | B2 * | 6/2006 | Maguire | 406/18 |
| 7,104,743 | B2 * | 9/2006 | Rainville et al. | 414/288 |

\* cited by examiner

*Primary Examiner*—Joe Dillon, Jr.
(74) *Attorney, Agent, or Firm*—Hovey Williams LLP

(57) ABSTRACT

A vacuum modulating air control valve includes a valve body with air intake ports, an output port, and a valve throat. A valve member is slidably mounted within the valve body between open positions relative to the valve throat and a closed position, to which the valve member is urged by a valve spring. A pneumatic cylinder has a piston forming a vacuum chamber and has a piston rod connected to the valve member. The output port is connected to a feedpoint of a vacuum conveying system, and the vacuum chamber is connected to a vacuum line communicating with the vacuum conveying system. A vacuum level within the vacuum chamber retracts the valve member from the throat, thereby admitting ambient air into the vacuum conveying system to control a material-to-air ratio within the system.

8 Claims, 2 Drawing Sheets

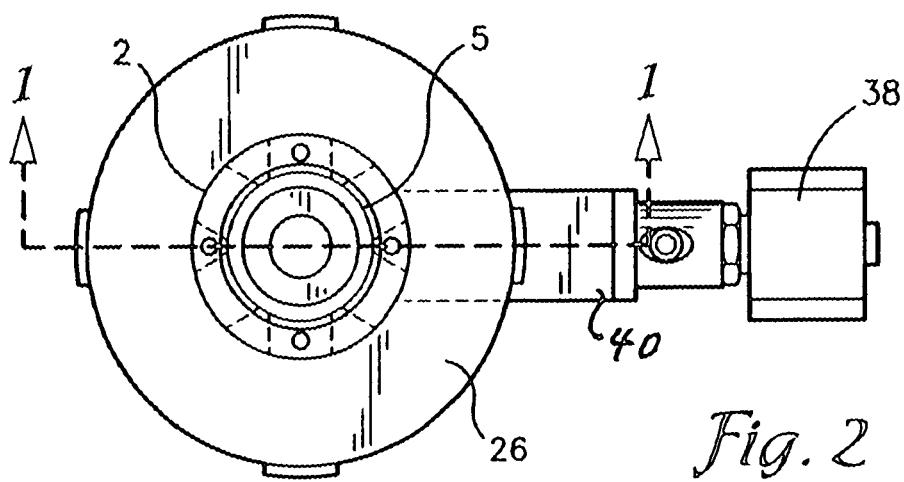
Fig. 2
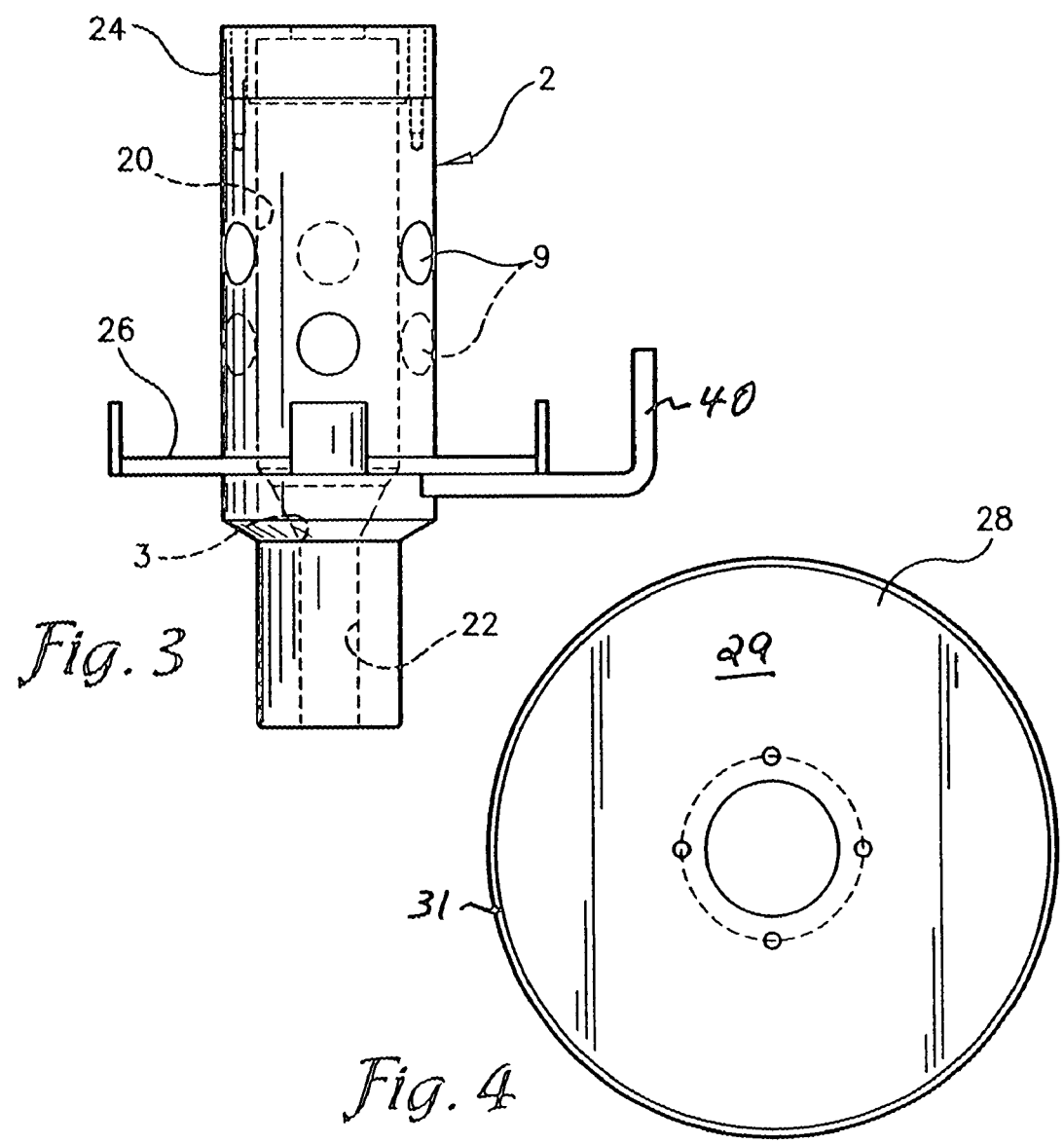
Fig. 3
Fig. 4

VACUUM MODULATING AIR CONTROL VALVE APPARATUS

CROSS-REFERENCE TO RELATED APPLICATION

This application claims priority under 35 U.S.C. 119(e) and 37 C.F.R. 1.78(a)(4) based upon copending U. S. Provisional Application, Ser. No. 60/833,686 for VACUUM MODULATION AIR CONTROL VALVE, filed Jul. 27, 2006, which is incorporated herein by reference.

BACKGROUND OF THE INVENTION

The present invention relates to pneumatic conveying systems and, more particularly, to a vacuum modulating air control apparatus which controls aspects of operation of a vacuum pneumatic conveying system.

Pneumatic conveying systems are frequently used for conveying bulk particulate materials for processing such materials or for feeding such materials into processes which use the materials. So-called dense phase pneumatic conveying systems operate below the minimum suspension velocity for a given material and are characterized by the product moving along the bottom of a pipe in "slugs" or a moving bed. The product is conveyed at high differential pressures below its saltation velocity, that is, the gas flow velocity below which the material begins to settle out of the gas flow. Conveying velocities are typically less than 2600 FPM (feet per minute), and material-to-air ratios of up to 100 to 1 are possible. Interaction of the particles in a dense phase system is greater than in a dilute phase conveying systems. Common applications for dense phase conveying systems include products with heavy bulk-densities, abrasive products, friable products, blended products, and, in some instances, products that do not require continuous delivery to their destinations.

Vacuum dense phase pneumatic conveying systems employ high vacuum pumps and special feeding mechanisms to form moving slugs of material which are conveyed at sub-atmospheric pressures. The result is minimized pipe friction and maximum protection of the product for multiple applications. Products commonly conveyed in vacuum dense phase systems include: friable products, blended products, and abrasive materials. These products may include sugar, pet food products, carbon black prills, plastic pellets, detergents, and the like. Depending on the product to be conveyed, variations in the configuration of the conveying system may be necessary with respect to such features as size and material characteristics of conveying conduits, structural support of the conduits, vacuum levels, conveying velocities, and the like.

There are two conventionally used methods for feeding products to be conveyed into a vacuum conveying system. In one method, an impulse valve alternates between drawing material and air into the conduit on a timed basis to create the desired material-to-air ratio. In a second method, a series of static bleed valves is used to balance the ratio of material and air.

SUMMARY OF THE INVENTION

The present invention provides an improved control apparatus for a vacuum pneumatic conveying system. An embodiment of the invention provides an improved vacuum modulating air control valve apparatus for regulating the balance of material-to-air at the feed point of a vacuum dense phase pneumatic conveying system. Airflow into the system is throttled by way of an adjustable orifice. The orifice housing has a pintle (or pintel) or valve member on the end of a shaft mounted therein for reciprocating movement along the shaft which is connected to an air cylinder. Apertures are formed in walls of the housing to admit air through the orifice into the feedpoint when the orifice is open. A spring is positioned on the shaft between a stop and an end cap of the housing and urges the valve member toward a closed position. A static vacuum line communicates between the air cylinder and a clean vacuum line of the vacuum conveying system, whereby a vacuum of a selected pressure draws a piston of the cylinder in such a direction as to retract the valve member out of its seated position against the force of the spring to thereby allow air to flow into the feedpoint.

The resulting operation allows the feed of air and the particulate product into the system to be mechanically controlled by the overall vacuum level in the system by modulating the amount of air that can be drawn through the orifice. As the vacuum level rises in the system, the cylinder piston is drawn up from its resting position, while the spring resists movement. When movement does occur, the shaft lifts the valve member out of the orifice throat or seat, enabling air to flow into the system to move the product and, consequently, reducing the vacuum in the system. As the vacuum in the system drops, the vacuum in the air cylinder is also reduced, thereby allowing the spring compression to urge the valve member back toward the orifice throat, reducing the cross sectional of the orifice and allowing the vacuum to again rise. By this means, the vacuum level in the system is modulated, thereby controlling the entry of air into the system and controlling the material-to-air ratio of the vacuum conveying system.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a top plan view of the valve body of the apparatus and illustrates a solenoid valve for use therewith.

FIG. 3 is a side elevational view of valve body of the apparatus and illustrates a plurality of ambient air intake ports thereof.

FIG. 4 is a top plan view of a guard/cover for use with the vacuum modulating air control valve apparatus.

DETAILED DESCRIPTION OF THE INVENTION

Figure 1:
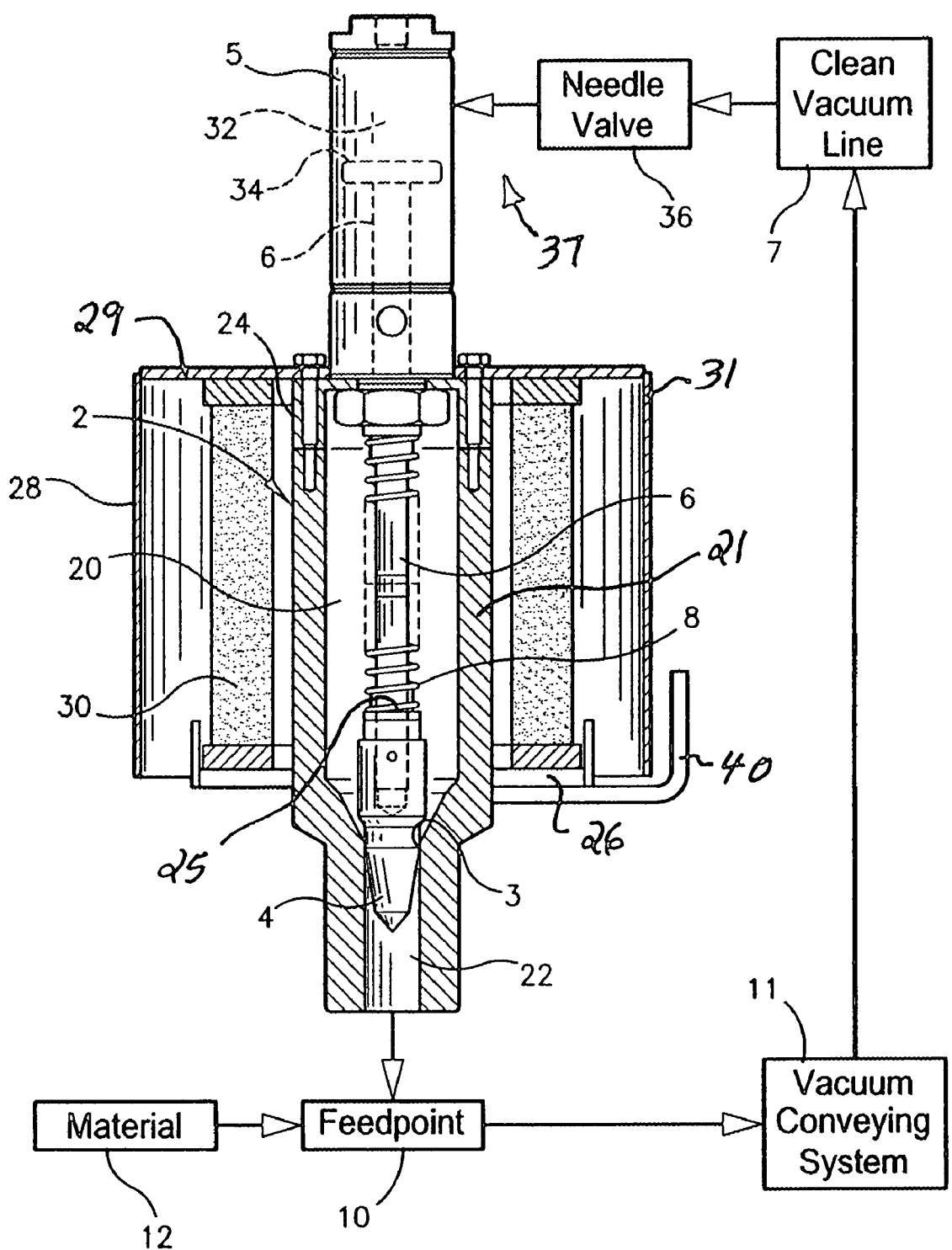
FIG. 1 is a cross sectional view of an embodiment of the vacuum modulating air control valve apparatus, taken on line 1-1 of FIG. 2 at a somewhat enlarged scale, and illustrates internal details of the apparatus, along with components of a vacuum conveying system shown diagrammatically.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring now to the drawing figures, the reference numeral 1 (FIG. 3) generally designates a vacuum modulating air control valve apparatus which is an embodiment the present invention. The illustrated apparatus 1 generally includes a valve body 2 having a throat or valve seat 3, a pintle or valve head 4 positioned within the valve body 2 to seal the throat 3, an air or pneumatic cylinder 5 having a rod 6 connected to the valve head or valve member 4, a clean vacuum line 7 communicating with the cylinder 5 in such a manner as to draw the valve member 4 out of sealing engagement with the throat 3 to an open condition, and a spring 8 positioned on the cylinder rod 6 and urging the valve member 4 toward sealing engagement with the throat 3 in a closed condition. The valve body 2 has a plurality of circumferentially spaced intake ports 9 (FIG. 3) formed therethrough which open to air at ambient pressure. In general, the valve apparatus 1 functions to control the admission of air at a feedpoint 10 of a vacuum dense phase pneumatic conveying system 11 to thereby control the ratio of particulate material 12 to air within the conveying system 11.

The illustrated valve body 2 has a stepped cylindrical outer shape with inner bores forming a main chamber 20, the throat 3, and an outlet port 22. The intake ports 9 are formed in a cylindrical wall 21 surrounding the main chamber 20. The main chamber 20 is closed by a top end cap 24 which is secured to the valve body 2 by fasteners, such as the screws illustrated. The end cap 24 is bored to enable passage of the rod 6 therethrough from the cylinder 5 into the chamber 20. The spring 8 is a compression spring positioned on the rod 6 and is engaged between the end cap 24 and a shoulder 25 of the valve member 4 to urge the valve member 4 toward engagement with the throat 3. The valve body 2 includes a filter seat or support 26 (FIGS. 1-3) at a lower end and has a cylindrical guard cover 28 (FIGS. 1 and 4) which, as illustrated, may have a disc wall 29 at a top end and a cylindrical side wall 31 forming an open lower end.

A hollow cylindrical or annular air filter 30 is positioned between the top disc wall 29 of the cover 28 and the filter support 26 and filters air flowing into the intake ports 9. The air cylinder 5 has a vacuum chamber 32 formed therein by a piston 34 and the cylinder casing. The piston 34 is secured to the top end of the rod 6. The clean air vacuum line 7 communicates with the vacuum chamber 32 through a needle valve 36 which is adjustable to damp the vacuum signal coming from the vacuum line 7 to prevent overcompensation of the valve member 4 to the level of vacuum in the line 7. The vacuum chamber 32, in cooperation with the piston 34, the needle valve 36, and the clean vacuum line 7 form, in effect, a vacuum sensor 37 for sensing the vacuum level in the vacuum conveying system 11. The vacuum level within the vacuum, chamber 32 acts on the piston 34 to cause the orifice 3 to be opened in proportion to the level of vacuum present in the vacuum chamber 32, as adjusted by the needle valve 36. In the illustrated apparatus 1, a solenoid valve 38 (FIG. 2) is mounted on a bracket 40 and connected to the valve apparatus 1 in such a manner as to override the force of the spring 8 to open the orifice 3 for cleanout purposes.

In operation, vacuum from the clean vacuum line 7, which communicates with the vacuum conveying system 11, acts on the cylinder piston 34, retracting the valve member 4 from the throat 3 thereby enabling ambient air to enter the chamber 20 through the filter 30 and the ports 9 and flow through the orifice 3 and into the feedpoint 10 of the vacuum conveying system 11. The flow of air into the conveying system 11 decreases the vacuum level (raises the absolute pressure) which, through the clean vacuum line 7, causes the spring 8 to urge the valve member 4 toward closure of the throat 3. At a condition of equilibrium, as adjusted by the needle valve 36, the orifice formed by cooperation of the valve member 4 and the throat 3 establishes a steady air flow rate which results in a desirable flow rate of the material through the vacuum conveying system 11 and a desirable material-to-air ratio therein.

While the illustrated valve apparatus 1 is configured as a mechanical device with pneumatic control of the valve head 4 to control the admission of air into the feedpoint 10 of the vacuum conveying system 12, it is foreseen that other control arrangements could be employed, such as electronic sensing (not shown) of vacuum level in the vacuum line 7 and proportional control of the valve head 4 using an actuator (not shown) driven by an electronic amplifier or digital processor (not shown).

Therefore, it is to be understood that while certain forms of the present invention have been illustrated and described herein, it is not to be limited to the specific forms or arrangement of parts described and shown.

What is claimed and desired to be secured by Letters Patent is:

1. A vacuum modulating air control valve apparatus for controlling an amount of air supplied to a vacuum pneumatic conveying system at a feedpoint to thereby control a ratio of particulate material to air within the conveying system, the apparatus comprising:
    a hollowed valve body;
    an air output port in fluid communication between the valve body and the feedpoint and allowing for communication of air through said valve body and to said feedpoint;
    a valve member positioned within the hollowed valve body and configured to selectively seal the air output port;
    a pneumatic cylinder having a piston and presenting a vacuum chamber;
    a rod disposed between and connecting the piston and the valve member and extending through the valve body;
    a spring positioned on the rod and configured to urge the valve member toward the air output port for sealing engagement with the output port in a fully closed condition;
    a clean vacuum line in pneumatic communication between the vacuum conveying system and the pneumatic cylinder; and
    at least one air intake port associated with the valve body and allowing communication of ambient air through the intake port and to the valve body,
    wherein upon application of a vacuum in the pneumatic cylinder by the clean vacuum line, the piston retracts so as to retract the rod, thereby compressing the spring,
    wherein upon retraction of the rod, the valve member is at least partially retracted from the output port, such that ambient air is allowed to enter the valve body via the at least one air intake port,
    wherein upon ambient air entering the valve body, air is supplied to the feedpoint through the air output port in proportion to a level of vacuum in the vacuum conveying system.

2. An apparatus as set forth in claim 1, wherein
    said pneumatic cylinder cooperates with said valve member to throttle said valve member through a range of conditions from said fully closed condition, through increasingly open conditions, to a fully open condition.

3. An apparatus as set forth in claim 2 and including:
    a needle valve engaged between said pneumatic cylinder and said clean vacuum line and operable to adjust a vacuum level communicated thereto.

4. An apparatus as set forth in claim 3 and including:
a filter cooperating with said air intake port in such a manner as to filter said ambient air communicated by said valve member to the vacuum conveying system.
5. An apparatus as set forth in claim 4 and including:
a valve motor engaged with said valve member, said valve motor being selectively operable to open said valve member for cleanout purposes.
6. An apparatus as set forth in claim 1, said valve body having a valve seat presenting a throat in fluid communication with said air output port.

7. An apparatus as set forth in claim 6,
wherein the hollowed valve body presents a hollowed area having a width,
wherein the throat has a width,
wherein a width of the hollowed area is greater than the width of the throat.
8. An apparatus as set forth in claim 7, wherein the valve member tapers inwardly.

\* \* \* \* \*